Dec. 29, 1942.　　　M. RONNING　　　2,306,753
CLEANING MECHANISM FOR COMBINES
Filed Feb. 19, 1940　　　3 Sheets-Sheet 2

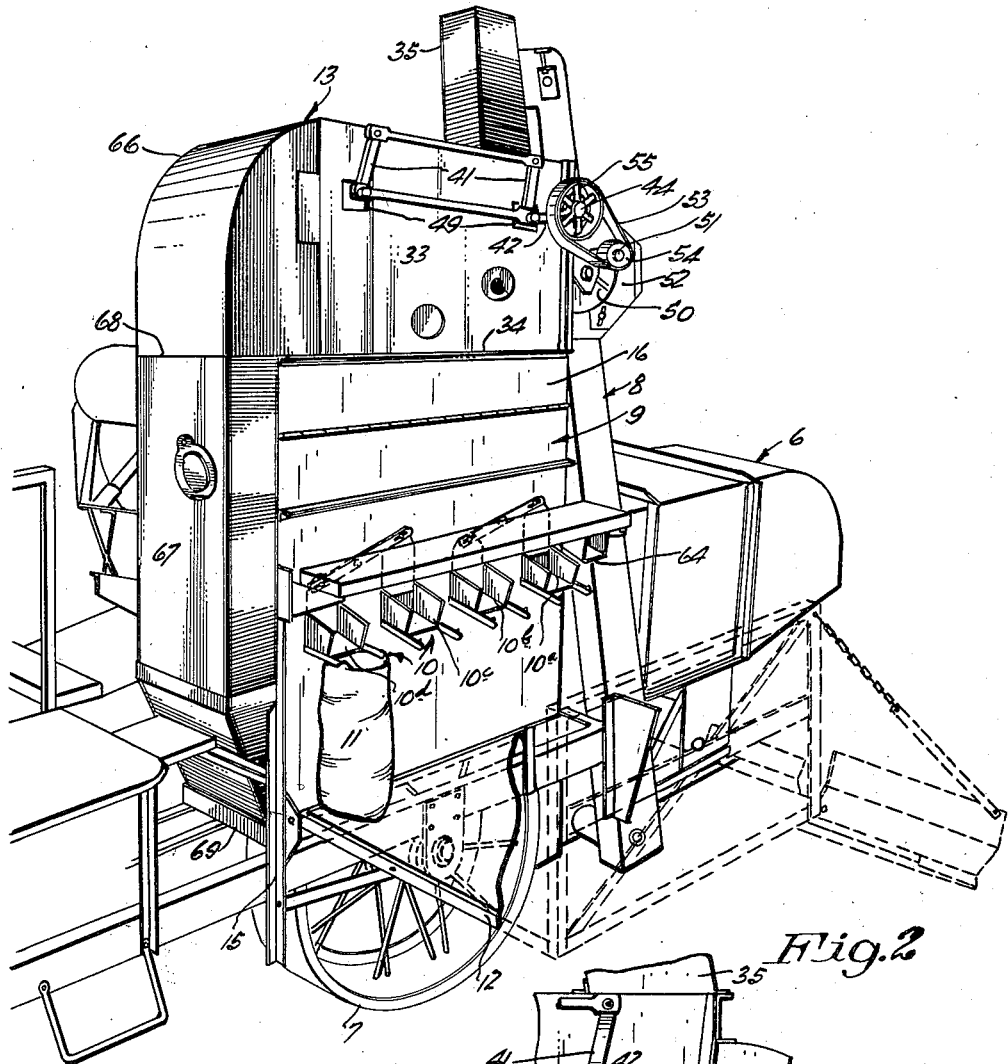

Inventor
MARTIN RONNING
By Carlsen & Hagle
Attorneys

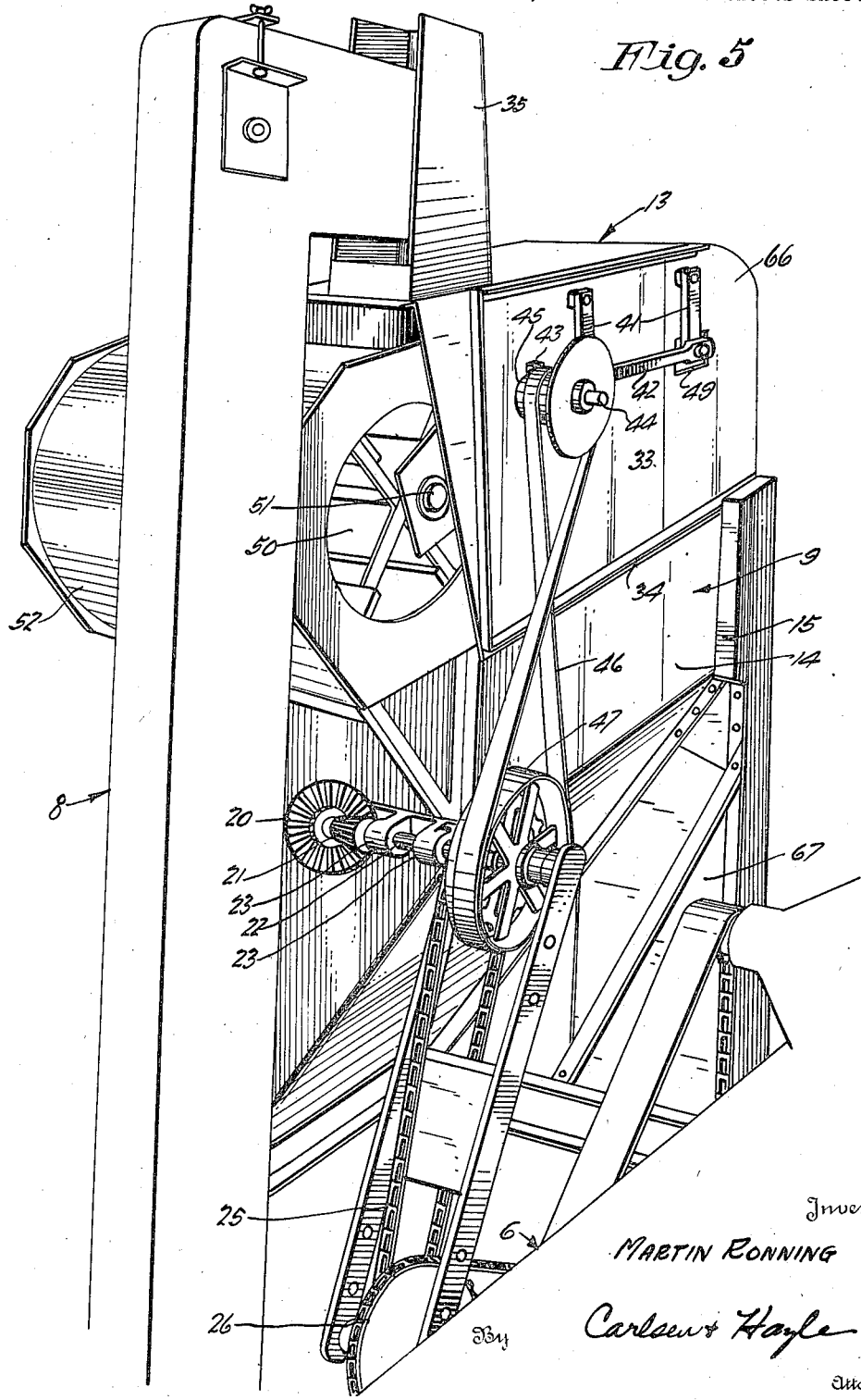

Patented Dec. 29, 1942

2,306,753

UNITED STATES PATENT OFFICE 2,306,753

CLEANING MECHANISM FOR COMBINES

Martin Ronning, St. Louis Park, Minn., assignor to Minneapolis-Moline Power Implement Company, Minneapolis, Minn., a corporation of Delaware Application February 19, 1940, Serial No. 319,679

3 Claims. (Cl. 209—21)

This invention relates generally to improvements in combines and more particularly to the cleaning mechanism of such machines.

Under certain conditions it has been found that the action of the usual cleaning shoe of the combine is insufficient to remove all tailings, dust, and fine seeds, and the grain mass delivered from the machine is undesirably mixed with such foreign materials. It is the primary object of the present invention, therefore, to provide a recleaner or auxiliary cleaning shoe and fan for further cleaning the grain and removing all undesirable particles. A further object of the invention is to provide a recleaner of this kind which may be conveniently arranged atop the graintank of the combine to receive the grain from the delivery elevator of the combine and drop the cleaned grain into the tank while carrying out the separated foreign matter for discharge to the ground or other place.

In connection with the foregoing the invention contemplates the provision of a recleaner for cooperative functioning along with the grader or classifier used in some combines, the recleaner then serving to clean out the tailings and seeds while depositing the cleaned grain in the classifier for grading as to size therein.

These and other more detailed and specific objects will be disclosed in the course of the following specification, reference being had to the accompanying drawings, in which—

Fig. 1 is a perspective view of the rear portion of a combine having a classifier, the view showing the grain tank, elevator and recleaner mechanism installed thereon, and certain parts of the sacking platform being shown in dotted lines.

Fig. 2 is a fragmentary detail side view of the eccentric drive for the recleaner shoe.

Fig. 5 is a fragmentary perspective view of the inner side portion of the grain tank elevator, classifier and recleaner, showing associated driving parts.

Figures 3, 4:
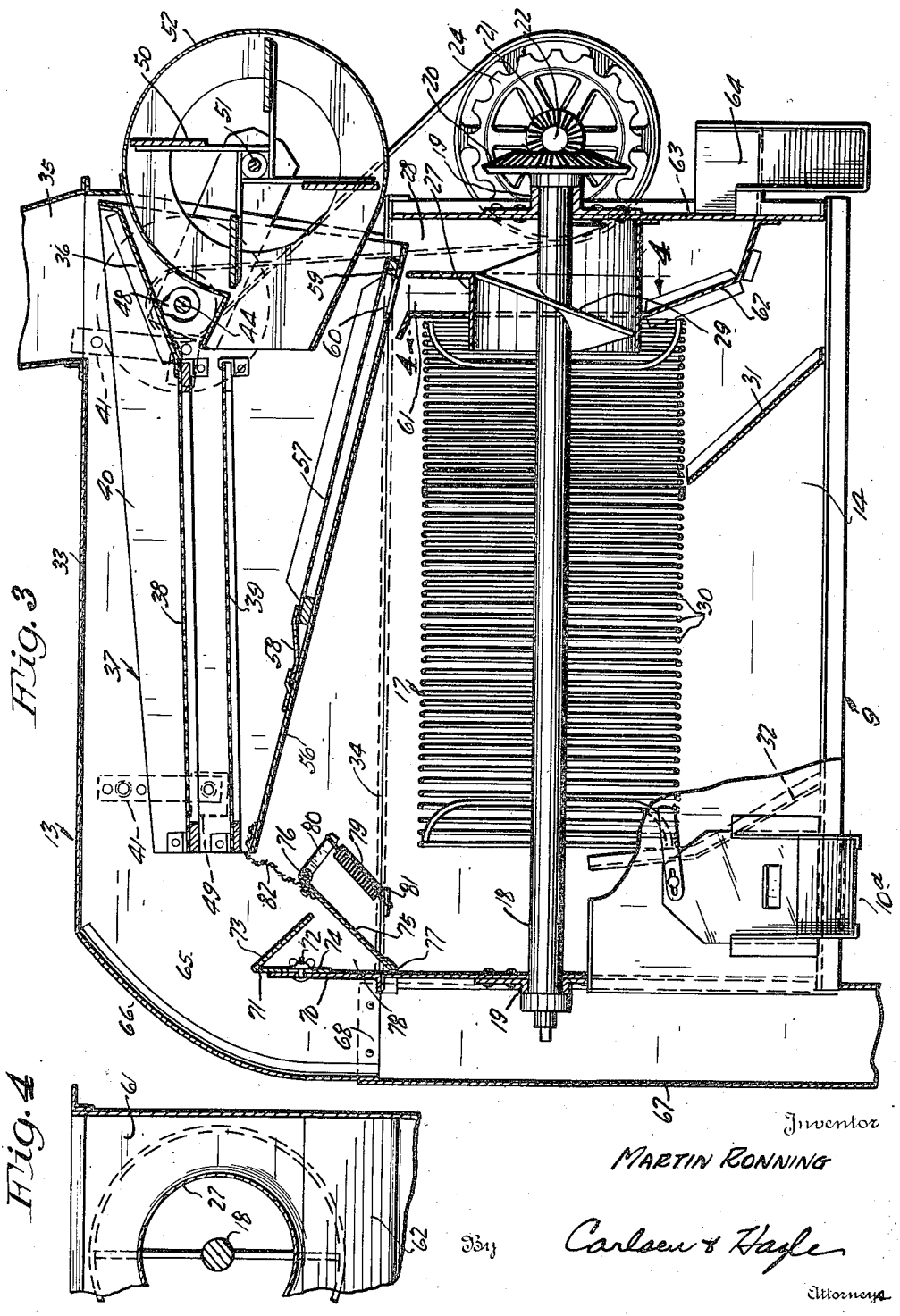
Fig. 3 is an enlarged vertical and longitudinal section through the classifier and recleaner.
Fig. 4 is a fragmentary cross sectional view along the line 4—4 in Fig. 3.

Referring more particularly and by reference numerals to the drawings, the body of a conventional combine or harvesting and threshing machine is indicated at 6, the same being supported by transversely spaced wheels one of which is shown at 7 and having connection at its forward end (not shown) with a draft device such as a tractor. The combine itself operates in the usual manner to harvest the crop, separate the grain from the straw, and clean and deliver the grain through the upright conveyor or elevator 8 to a graintank or other storage device. In the machine herein shown this device takes the form of a classifier or grader designated generally at 9, details of which will be later described, and ordinarily the grain is taken from this classifier in several grades through the spouts designated generally at 10 and sacked as represented at 11 by an operator standing on the lateral sacking platform 12 carried by the combine. The spouts may be shut off by the usual gates, as clearly shown.

The recleaner forming the present invention is represented generally at 13 and is mounted over the classifier 9 to receive grain from the elevator 8 and discharge the cleaned grain directly into the classifier. It is to be understood, however, that the recleaner may be used as well to clean grain as it is discharged into the usual grain tank taking the place of the classifier, where grading of the grain is not required, and in either case the recleaner forms a readily mounted unit as will appear.

Turning now to details of the construction, the classifier 9 will be first described since in the assembly shown certain parts thereof drive and interconnect with the recleaner 13. A housing 14 of generally rectangular form is supported on the combine by framing 15 in an elevated position and on one side thereof, and said housing has on its outer side an inspection door 16 and therebelow the spouts 10 for the grain. A spiral type of classifier device designated generally at 17 is journaled by its axle 18 longitudinally in the housing 14, the ends of the axle projecting through bearings 19 outwardly through the housing ends. A bevel gear 20 carried at one end of the axle 18 meshes with a bevel pinion 21 carried on a drive shaft 22 which is journaled in bearings 23 on the end of the housing 14. A sprocket 24 on this shaft 22 is driven by a chain 25 from a rotating part 26 of the usual combine driving mechanism, and these connections are of course such that the classifier device 17 will be rotated as the combine operates.

At one end a tubular, non-rotatably supported intake housing 27 surrounds the axle 18 and enters the classifier device 17 and an upwardly opening spout or hood 28 receives the grain which is then fed endwise by a spiral screw or flight 29 carried by the axle within the housing. The classifier device 17 comprises conventionally a spiral coil 30, the individual convolutions of which may be spread apart or contracted in usual manner in order to vary the spacing therebetween. The grain is rolled around in this coil and falling through the spaces therein is separated and graded as to size. As here shown the intake end of the coil passes the smaller grain to the spout 10a as guided by a baffle 31, while the larger grain may flow to spouts 10b and 10c guided by baffle 32.

This classifier is conventional, as is the spouting and sacking arrangement, and it will be understood that other types, such as one employing a perforated drum, may be employed if so desired.

The recleaner 13 comprises a housing 33 open at its underside 34 and flanged to set atop the classifier housing 14 (or the grain tank where a classifier is not used) in communication therewith. An upper end portion of this housing 33 has an intake hood 35 which receives the grain from the elevator 8 and drops the same onto a pan 36 within the recleaner. A recleaning shoe 37, having upper and lower sieves 38 and 39, has its sides 40 hung by pivoted hanger arms 41 to the sides of the housing. These arms 41 are exteriorly arranged on inner and outer sides of the housing 33, being pivoted at upper ends thereto, and at their lower ends are joined by pitmans 42 which are driven as shown by eccentrics 43 to give the shoe 37 an endwise tossing motion. For this purpose an eccentric shaft 44 is journaled transversely through the housing 33 beneath the pan 36 and carries at its outer ends the eccentrics 43 connected to the pitmans. Also at the inner end the shaft has a pulley 45 from which a drive belt 46 runs to a pulley 47 on the shaft 22 to drive the eccentrics. Beneath the pan 36 a cam 48 is mounted on the shaft 44 to impart a vibrating movement to the pan and cause it to feed the grain more readily off its lower end onto the upper ends of the recleaning sieves 38—39. The housing sides are of course slotted as designated at 49 to permit connection of lower ends of the hanger arms 41 to the shoe sides 40 and afford clearance for the eccentric actuated tossing movement of the shoe.

A cleaning fan 50 is journaled by its axle 51 in a housing 52 fixed in the end of the housing 33 so that the discharge duct of the fan may extend upwardly toward and beneath the sieves 38 and 39. The fan is driven by a belt 53 over pulleys 54, on the axle 51, and 55 on the adjacent eccentric shaft 44.

The shoe sides 40 depend below the sieves 38—39 and a bottom pan 56 extending therebetween slopes in the opposite direction downwardly toward the intake end of the classifier 17, the end of this pan terminating immediately over the intake opening 28 of the housing 27. A fine mesh screen 57 is mounted over a lower end portion of the pan 56 with a guide strip 58 at its upper end to guide material from the sieves over this screen. Beneath the lower end of the screen 57 the bottom pan 56 has a stop strip 59 and an opening 60 through which material passed by the screen may drop directly into a by-pass duct 61 defined by a transverse partition 62 which surrounds the housing 27; and at its lower side inclines toward the adjacent end of the classifier housing 14 to discharge through an opening 63 therein and into a laterally opening chute 64 carried on the housing. The duct 61 of course extends substantially the entire width of the housing 14 to receive materials from the full width of the recleaning shoe 37.

The discharge ends of the sieves 38—39 fall short of the end of the housing 33 opposite to that in which the fan is located, and this end has an upper opening 65 over which is extended an end cover or hood 66. A wide discharge duct or conduit 67 of rectangular cross section is secured beneath the open lower end 68 of the cover 66 and extends downwardly along the forward side of the classifier 9 to end in a lower discharge vent 69 located immediately forward of, and above, the wheel 7.

The housing end 70, over which the cover 66 is mounted, terminates short of its full height to form the opening 65 and an angular baffle or deflector plate 71 is mounted by a screw 72 on this end. This deflector plate has an end 73 turned inwardly and downwardly and vertical adjustment may be made by loosening and refastening the screw 72 which passes through a slot 74 as shown, such adjustments moving the plate nearer or further from the discharge end of the recleaning shoe and at the same time varying the size of the opening 65.

A gate 75 is pivotally mounted by a transverse pin 76 in the housing in inwardly spaced relation to the plate 71 and inclines outwardly and downwardly to stand normally with its lower edge 77 against the housing end below the plate and thereby form a pocket 78. A light coil spring 79 stretched between an arm 80 on the pin 76 and a bracket 81 on the housing normally holds the gate in this position. A fabric strip 82 joins the discharge end of the recleaning shoe and the gate 75 to prevent material discharged from the shoe from falling back therebeneath.

One of the spouts 10, designated specifically at 10d, receives material from directly beneath the gate 75 which material is prevented by the baffle 32 from comingling with the classifier material as will be evident.

In operation the conglomerate mass of grain, tailings, seeds, dust and the like which, under such conditions as require the use of the recleaner, are carried by the elevator 8, are dumped through the hood 35 onto the pan 36, and are guided thereby to the shoe 37. This shoe being given a tossing motion causes the material to flow toward its discharge end and the grain and fine seeds of course fall through the sieves 38—39. The lighter materials such as dust and tailings are blown out by the fan 50 through the opening 65 and fall to the ground through the conduit 67. The grain and seeds passed by the sieves 38—39 then flow over the screen 57, which separates the seeds and discharges them through duct 61 and spout 64 for sacking or other disposal, and the cleaned grain enters the classifier 17 at 28 for grading and sacking.

The heavier tailings and grain passed off the sieves 38—39 strikes the plate 73 and is deflected thereby into the pocket 78. As the weight of this material increases it periodically overcomes the tension of the spring 79, swings the gate 75 open, and drops through the spout 10d for sacking or disposal.

It is thus apparent that by use of this recleaner the material may be finally separated into its component parts and a clean grain secured. The device may obviously be used as well on the usual grain tank in which suitable means may be readily incorporated for carrying off the seeds and coarse or heavy tailings. The novel shape and construction of the recleaner makes it particularly easy to install atop either a grain tank or classifier, and the downwardly extending discharge duct or conduit 67 aids in, and blends nicely into such an assembly. Additionally this position of the duct 67 causes the discharge of the dust, tailings, etc., to the ground beneath the wheel of the combine to prevent such materials from interfering with the work of the man or men on the sacking platform 12.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A cleaning mechanism for a combination harvester and thresher having at least one supporting wheel and having an elevated receptacle and a conveyor for conducting threshed material thereto, comprising a housing mounted on the upper side of the receptacle, means in the housing for separating materials received from the conveyor and delivering the cleaned material into the receptacle, and a discharge duct extended from one end of the housing downwardly along an end of the receptacle for discharging separated material to the ground, the said duct terminating at its discharge end forwardly of the said supporting wheel of the harvester and thresher for discharging the material directly beneath the wheel as the machine advances over the field.

2. A recleaner mechanism for a combine, comprising a housing, a sieve equipped cleaning shoe movably mounted therein for receiving and separating material, means for conducting material from the combine to the shoe, means for delivering the separated material, a fan for blowing out lighter materials passing over the shoe, an adjustable deflector member supported adjacent the delivery end of the shoe, and a gate below the deflector member forming a pocket for the collection of heavier particles blown from the shoe by the fan, the said gate being releasable by weight of accumulated material thereon for periodically discharging said materials.

3. A recleaner mechanism for a combine, comprising a housing, a sieve equipped cleaning shoe movably mounted therein for receiving and separating material, means for conducting material from the combine to the shoe, means for delivering the separated material, a fan for blowing out lighter materials passing over the shoe, the said housing having an outlet for material blown out by the fan, a member adjustable in the outlet for downwardly deflecting heavier parts of the material blown from the shoe, a gate member movably supported below the deflecting member to receive and support said heavier materials, the said gate member being releasable by weight of the material gathered thereon, and means for receiving the material intermittently dropped from the gate member.

MARTIN RONNING.